United States Patent
Tschorn et al.

(10) Patent No.: US 6,226,498 B1
(45) Date of Patent: May 1, 2001

(54) METHOD AND CONFIGURATION FOR MONITORING COMMUNICATIONS LINKS IN A MOBILE RADIO SYSTEM

(75) Inventors: Hans-Jürgen Tschorn, Planegg; Robert Iberl, München; Jürgen Grohs, Grünwald; Axel Gabe, Donauwörth, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/531,192

(22) Filed: Mar. 20, 2000

Related U.S. Application Data (63) Continuation of application No. PCT/DE98/02685, filed on Sep. 10, 1998.

(30) Foreign Application Priority Data

Sep. 18, 1997 (DE) .............................. 197 41 216

(51) Int. Cl.[7] .................................................. H04B 17/00
(52) U.S. Cl. ..................... 455/67.1; 455/410; 455/560; 455/12.1
(58) Field of Search .................... 455/12.1, 427, 455/428, 429, 430, 450, 452, 410, 411, 560, 565, 423, 425, 67.1; 380/247

(56) References Cited

U.S. PATENT DOCUMENTS

| | | | |
|---|---|---|---|
| 5,809,396 | * 9/1998 | Armbruster et al. | 455/429 |
| 5,933,777 | * 8/1999 | Rahman | 455/450 |
| 5,937,345 | * 8/1999 | McGowan et al. | 455/410 |
| 5,946,618 | * 8/1999 | Agre et al. | 455/428 |
| 5,956,637 | * 9/1999 | Ericsson et al. | 455/414 |
| 6,041,124 | * 3/2000 | Sugita | 380/247 |
| 6,073,012 | * 6/2000 | Vanden Heuvel et al. | 455/429 |
| 6,108,537 | * 8/2000 | Comer et al. | 455/426 |
| 6,119,000 | * 9/2000 | Stephenson et al. | 455/432 |
| 6,122,499 | * 9/2000 | Magnusson | 455/433 |
| 6,128,501 | * 10/2000 | Ffoulkes-Jones | 455/427 |

FOREIGN PATENT DOCUMENTS 0 658 014   6/1914   (EP) .

OTHER PUBLICATIONS

Published International Application No. WO 97/21296 (Armbruster et al.), dated Jun. 12, 1997;.

"Zukunftsmarkt satellitengestützte Mobilkommunikation" (Huber), dated 1994, telcom report 17, Heft 5, pp. 180–183, pertains to the future market of satellite supported mobile communication;.

"Law Enforcement and Mobile Communications" (Thorogood), dated 1996 XP 000602804, The Institution of Electrical Engineers, pp. 11/1–11/5;.

\* cited by examiner

*Primary Examiner*—William G. Trost
*Assistant Examiner*—Quang Vu
(74) *Attorney, Agent, or Firm*—Herbert L. Lerner; Laurence A. Greenberg; Werner H. Stemer (57) ABSTRACT

A correspondence table is stored in a mobile switching center. In the correspondence table, at least one local area code for a geographical subarea is assigned to each authorization organization number of an authorization organization. Furthermore, a supervision file is stored in which a mobile subscriber number is entered for a mobile subscriber who is to be monitored. When an attempt is made to set up a connection from/to the mobile subscriber, the correspondence table is used to determine whether respective authorization organizations are authorized to monitor the communications link in the geographical subarea in which the mobile subscriber is located. A configuration for monitoring communications links is also provided.

22 Claims, 5 Drawing Sheets

| MLT | |
|---|---|
| Authorization Organization ISDN Number | Local Area Codes of the Geographical Subareas |
| AOISDN1 | LAC1, LAC2, LAC3 |
| AOISDN2 | LAC4, LAC5, LAC6, LAC7 |
| AOISDN3 | LAC4, LAC5, LAC6, LAC7 |

FIG 3

| SF | |
|---|---|
| International Mobile Subscriber ISDN Number | Authorization Organization ISDN Number |
| MSISDN1 | AOISDN1, AOISDN2 |
| MSISDN2 | AOISDN3 |

METHOD AND CONFIGURATION FOR MONITORING COMMUNICATIONS LINKS IN A MOBILE RADIO SYSTEM

CROSS-REFERENCE TO RELATED APPLICATION

This application is a continuation of copending International Application No. PCT/DE98/02685, filed Sep. 10, 1998, which designated the United States.

BACKGROUND OF THE INVENTION

Field of the Invention

The invention relates to a method and a configuration for monitoring a communications link in a mobile radio system, in particular in a satellite-based mobile radio system.

In terrestrial mobile radio systems, such as the GSM mobile radio system (Global System for Mobile Communications), methods and configurations are known, through the use of which it is possible to monitor and record information transmitted via communications links. Since the network structure is configured on a national basis, and the mobile radio networks are thus separated, every nation has legal rights so that, for example, a French subscriber may be monitored only in the French mobile radio system. However, it is not possible to use this method to distinguish between monitoring authorizations based on regions of a country.

In the future, when satellite-based mobile radio systems are built, such as IRIDIUM, as is known for instance from the article by J. Huber "Zukunftsmarkt satellitengestutzte Mobilkommunikation", telcom report 17 (1994) [Future market for satellite-based mobile communication] Issue 5, pages 180 to 183, no direct guarantee of the legal rights of the individual nations will be possible either, since, for example, there will be only one satellite mobile switching center for all subscribers in Central Europe. This satellite mobile switching center will be used to switch the communications links of all those subscribers who are located in the area covered by one or more satellites, which are connected by radio to the satellite mobile switching center via an earth terminal controller, and/or to produce the interface to further terrestrial fixed networks or mobile radio networks.

SUMMARY OF THE INVENTION

It is accordingly an object of the invention to provide a method and a configuration for monitoring communications links in a mobile radio system which overcome the above-mentioned disadvantages of the heretofore-known methods and configurations of this general type and which will ensure the legal rights of regions and nations to monitor communications links of subscribers of a mobile radio system or a satellite mobile radio system.

With the foregoing and other objects in view there is provided, in accordance with the invention, a method for monitoring communications links, the method including the steps of:

providing, in a mobile radio system, a mobile switching center connected to a further mobile switching center or a communications network;

assigning, with a radio network management device, radio resources to a communications link within a geographical subarea, the radio network management device being connected to a base station for transmitting and receiving information via the communications link to/from a mobile station of a mobile subscriber located in the geographical subarea;

storing a correspondence table, e.g. an MC-LAC table, in an interception unit of the mobile switching center, and assigning, in the correspondence table, a local area code of the geographical subarea to an authorization organization number of an authorization organization, the authorization organization being a regional, a national or an international authorization organization;

storing a supervision file in the interception unit, and entering, into the supervision file, an international mobile subscriber number for the mobile subscriber to be monitored by the authorization organization;

using the correspondence table for determining whether the authorization organization is authorized to monitor the communications link in the geographical subarea identified by the local area code, if an attempt to set up a connection from/to the mobile station of the mobile subscriber is made;

assigning the authorization organization number to the international mobile subscriber number in the supervision file when an authorization for monitoring exists; and recording one of information transmitted from the mobile station and information received by the mobile station via the communications link.

In accordance with another mode of the invention, information recorded in the mobile switching center is switched and transmitted to the authorization organization identified by the authorization organization number when the communications link has been cleared.

In accordance with yet another mode of the invention, information from the mobile switching center is diverted to the authorization organization identified by the authorization organization number, and the information is recorded in a monitoring device in the authorization organization.

In accordance with another mode of the invention, parameters in the correspondence table and in the supervision file are initialized and administered by an interception control center connected to the mobile switching center.

In accordance with a further mode of the invention, the authorization for monitoring information on the communications link is determined when the mobile subscriber enters a further geographical subarea or periodically at given time intervals.

In accordance with another mode of the invention, at least one supervision report with subscriber-relevant and connection-relevant information for the international mobile subscriber number entered in the supervision file is stored in the interception unit.

In accordance with another mode of the invention, a supervision report is transmitted to the authorization organization and/or an interception control center. The supervision report is then stored in a storage device of the authorization organization and/or the interception control center.

In accordance with a further mode of the invention, the authorization for monitoring the communications link is determined for a most recently known local area code when no local area code can be assigned to the mobile subscriber.

In accordance with another mode of the invention, a satellite-based mobile radio system and a satellite mobile switching center is used. Radio signals are transmitted or received to/from a satellite via an earth terminal controller. The satellite supplies a geographical area with the radio resources.

In accordance with another mode of the invention, in the correspondence table, a plurality of local area codes of the geographical subarea are assigned to respective authorization organization numbers of the authorization organization.

Given ones of the authorization organization numbers are assigned to the international mobile subscriber number in the supervision file when the authorization for monitoring exists.

With the objects of the invention in view there is also provided, a configuration for monitoring communications links in a mobile radio system, including:

a mobile switching center to be connected to a further mobile switching center or a communications network;

a radio network management device connected to the mobile switching center, the radio network management device assigning radio resources to a communications link within a geographical subarea;

a base station to be connected to a base station controller for transmitting and receiving information via the communications link to/from a mobile station of a mobile subscriber;

an interception unit associated with the mobile switching center;

the interception unit having a correspondence table storage for storing a correspondence table, the correspondence table assigning a local area code of the geographical subarea to an authorization organization number of an authorization organization;

the interception unit having a supervision file storage for storing a supervision file containing an international mobile subscriber number entered for the mobile subscriber to be monitored by the authorization organization; and a monitoring device, connected to the mobile switching center, for recording one of information transmitted from the mobile station and information received by the mobile station via the communications link.

In accordance with another feature of the invention, an interception control center is connected to the mobile switching center and is also to be connected to the authorization organization. The interception control center initializes and administers parameters in the correspondence table and in the supervision file.

In accordance with another feature of the invention, the monitoring device is provided in the mobile switching center.

In accordance with yet another feature of the invention, the monitoring device is to be provided in a regional, national or international authorization organization.

In accordance with a further feature of the invention, the interception unit stores a supervision report having subscriber-relevant and connection-relevant information for the international mobile subscriber number entered in the supervision file.

In accordance with another feature of the invention, a storage device is to be provided in the authorization organization. The interception unit transmits the supervision report to the storage device for storing the supervision report in the storage device.

In accordance with another feature of the invention, a storage device is provided in the interception control center for storing a supervision report having subscriber-relevant and connection-relevant information for the international mobile subscriber number.

In accordance with another feature of the invention, a data base subscriber is connected to the mobile switching center. The data base subscriber stores the local area code of the geographical subarea of the mobile station.

With the objects of the invention in view there is also provided, in a satellite-based mobile radio system having a satellite for supplying a geographical area with radio resources and an earth terminal controller, a configuration for monitoring communications links, including:

a satellite mobile switching center for transmitting and receiving radio signals to/from the satellite via the earth terminal controller, the satellite mobile switching center to be connected to at least one of a further satellite mobile switching center and a communications networks;

an interception unit associated with the satellite mobile switching center;

the interception unit having a correspondence table storage for storing a correspondence table, the correspondence table assigning a local area code of the geographical subarea to an authorization organization number of an authorization organization;

the interception unit having a supervision file storage for storing a supervision file containing an international mobile subscriber number entered for the mobile subscriber to be monitored by the authorization organization; and a monitoring device, connected to the satellite mobile switching center, for recording one of information transmitted from the mobile station and information received by the mobile station via the communications link.

According to the invention, the mobile radio system has at least one mobile switching center, which is networked with further mobile switching centers and/or allows access to other communications networks, has at least one device, more specifically a radio network management device, which assigns radio resources to communications links within a geographical subarea, and at least one base station, which is connected to the radio network management device, for transmitting and receiving information via a communications link to/from at least one first mobile station of a mobile subscriber.

According to the invention, a correspondence table, or so-called MC-LAC (Local Area Code) table, is stored in the mobile switching center. In this table, at least one local area code of a geographical subarea is assigned to each authorization organization number, or more specifically to each authorization organization ISDN (Integrated Services Digital Network) number, of a regional, national or international authorization organization. Furthermore, a supervision file or monitoring file is stored in the data base or interception unit, in which file an international mobile subscriber ISDN number is entered for the mobile subscriber who is intended to be monitored by one or more authorization organizations. If an attempt is made to set up a connection from/to the first mobile station of the mobile subscriber, the MC-LAC table is used to determine whether the respective authorization organizations are authorized to monitor the communications link in the geographical subarea identified by the local area code and in which the mobile subscriber is located. If the authorization exists, then the authorization organization ISDN numbers are assigned to the international mobile subscriber ISDN number in the supervision file, and the information transmitted from and/or received by the first mobile station via the communications link is recorded by at least one monitoring device.

The configuration according to the invention advantageously makes it possible that only those authorization organizations who have an authorization for the present location of the mobile subscriber are allowed to monitor the communications link of the mobile subscriber. This guarantees that regional and national local legal rights are observed, and prevents unauthorized monitoring or interception.

In first alternative embodiments of the invention, once the communications link from the mobile switching center has been cleared, the recorded information is switched and transmitted on the basis of the authorization organization ISDN numbers to the respective national or international authorization organizations, or the information is diverted directly to the respective authorization organizations, where it is recorded in the respective monitoring device. The first alternative embodiment in this case has the advantage that the information is recorded centrally in the mobile switching center, as a result of which the time penalty for switching to the authorization organizations is avoided and there is thus no detectable difference whatsoever from a normal connection setting-up process for the mobile subscriber who is to be monitored or intercepted. The advantage of the second embodiment is that no information is recorded in the mobile switching center, and is thus protected against unauthorized access by unauthorized third parties.

In a further embodiment of the invention, an interception control center which is connected to the mobile switching center is used for initialization and administration of the parameters in the MC-LAC table and in the supervision file. The use of such an interception control center is to administer all those parameters which are directly important for the monitoring process. These include, inter alia, the assignment of the geographical subareas to the authorization organizations, and the entry of the international mobile subscriber ISDN number in the supervision file. The interception control center may, if necessary, also be connected to the authorization organizations, so that they communicate only with this center and can directly influence the administration of the parameters. The determination of the authorization for monitoring or intercepting may also be initialized by the interception control center.

In a further embodiment, the authorization can be determined as a function of the mobile subscriber location, that is to say the authorization is determined once again when the mobile subscriber enters a different geographical subarea, or periodically at predefined time intervals. Particularly in the case of quasi-stationary mobile subscribers, location-dependent determination advantageously offers reduced processing complexity as well as a reduced signaling load between the interception control center and the mobile switching center, while at the same time ensuring compliance with national legal rights.

In a further embodiment of the invention, at least one monitoring report or so-called supervision ticket (S-ticket) for the international mobile subscriber ISDN number entered in the supervision file is also stored in the interception unit. Subscriber-relevant and connection-relevant information relating to the mobile subscriber, such as subscriber identity, date and time, connection type (outgoing (MOC) or incoming (MTC) mobile radio link) or else the call number for the "Call Forwarding Unconditional" (CFU) service are recorded and stored in this supervision ticket.

According to a further embodiment of the invention, the supervision ticket is either transmitted to the interception control center, where it is stored in a storage device and is transmitted to the respective authorization organizations where it is in each case stored in a storage device, or the supervision ticket is transmitted to the respective authorization organizations, where it is in each case stored in a storage device.

In further embodiments of the invention, a subscriber data base, also called Data Base Subscriber (DBSUB), is connected to the mobile switching center in which, inter alia, the local area code of the geographical subarea in which the mobile subscriber is located is stored, and is thus available to determine the authorization.

In the situation where the mobile subscriber cannot be directly assigned a local area code, for example in the case of the "Call Forwarding Unconditional" (CFU) service, the authorization to monitor the communications link is determined, in a further embodiment, for the most recently known local area code. This embodiment ensures that the mobile subscriber to be monitored cannot avoid monitoring simply by call forwarding.

According to a further embodiment of the invention, the mobile radio system is embodied as a satellite mobile radio system, in which case the mobile switching centers are embodied as satellite mobile switching centers which transmit and receive radio signals to/from a satellite via in each case at least one earth terminal controller, and in which case the satellite supplies a geographical area with radio resources. The geographical area may in this case include, for example, the jurisdiction areas of a number of countries, and may cover a large number of geographical subareas.

The following description of a plurality of exemplary embodiments of the method according to the invention and of the configuration according to the invention is intended to be of a purely exemplary nature. The features are not necessarily required in the manner in which they are described, in order to achieve the desired results.

Other features which are considered as characteristic for the invention are set forth in the appended claims.

Although the invention is illustrated and described herein as embodied in a method and a configuration for monitoring communications links in a mobile radio system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
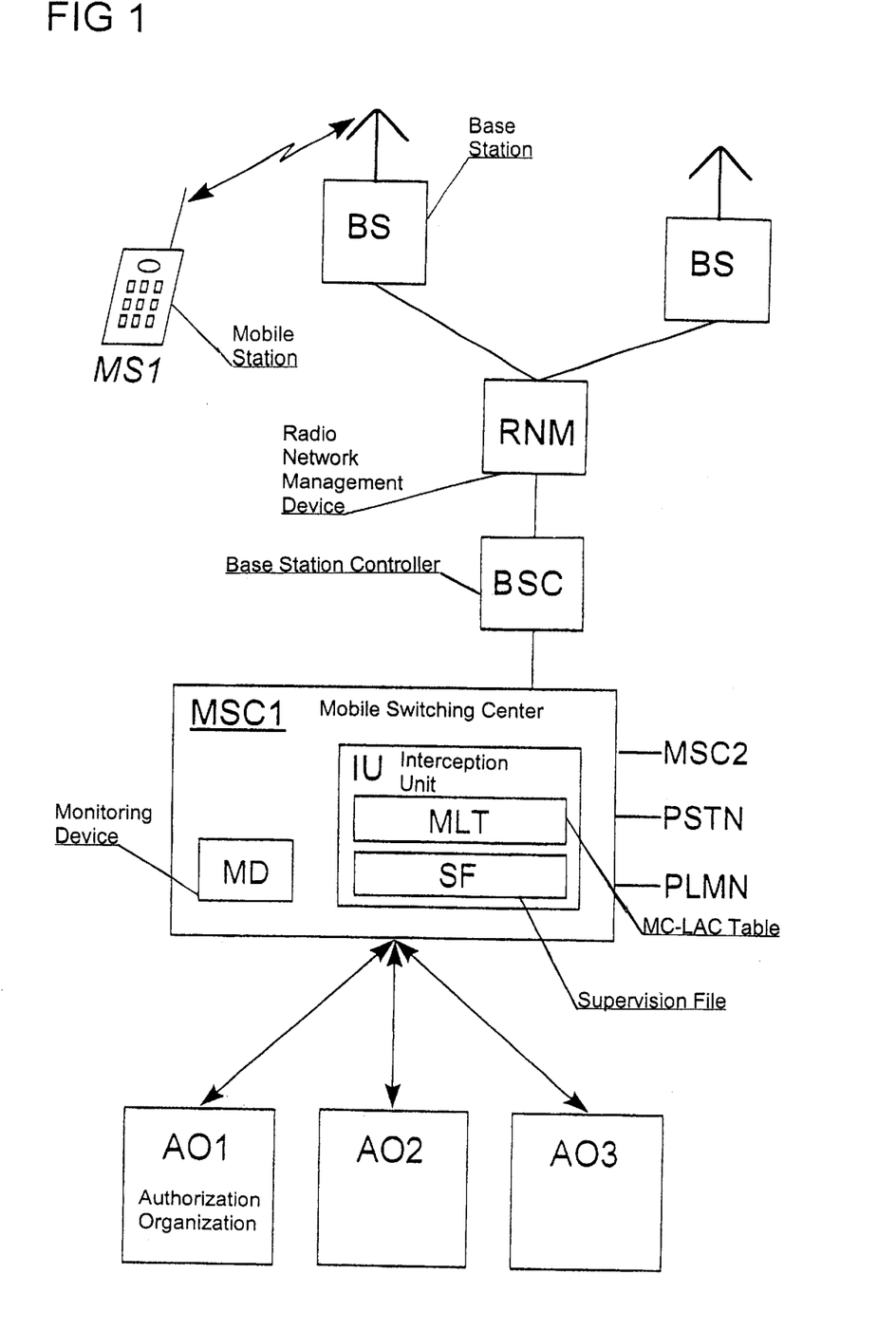
FIG. 1 is a block diagram of a part of a mobile radio system.

Referring now to the figures of the drawings in detail and first, particularly, to FIG. 1 thereof, there is shown a part of a mobile radio system, which corresponds to the known GSM mobile radio system and has a mobile switching center MSC1 which is networked with another mobile switching center MSC2 and/or allows access to terrestrial public land mobile networks PLMN and to public and private switched telephone networks PSTN. The mobile switching center MSC1 is connected to a radio network management device RNM, which is in turn connected via cables or directional radio links to one or more base stations BS. The base stations BS each use antenna devices to supply a radio zone, also called a radio cell, with radio resources. The radio network management device RNM thus controls a number of radio zones which, together, form, for example, a geographical subarea to which a specific local area code LAC1 . . . is assigned within the mobile radio system.

A first mobile station MS1 of a mobile subscriber MSUB1 who is located in the radio zone of the geographical subarea supplied by a base station BS can set up and clear a communications link to another subscriber, for example in a fixed network or some other mobile radio network. The setting up of a connection initiated by the first mobile station MS1 is switched in the mobile switching center MSC1 to the other subscriber, and information such as voice or data is transmitted via the communications link that has been set up. Using the local area code LAC1 . . . , the first mobile station MS1 can be assigned a present location in the mobile radio system at any time and this is used, for example, for paging when setting up a connection to the first mobile station MS1.

A plurality of regional, national or even international authorization organizations AO1, AO2 and AO3, such as the German Federal Criminal Bureau, the French Secret Service or the CIA, are connected to the mobile switching center MSC1. The authorization organizations AO1, AO2 and AO3 each have a geographical authorization limited, for example, by regional or national boundaries to determine the mobile subscriber MSUB1 for monitoring, and to monitor the information transmitted via the communications links from/to the mobile subscriber MSUB1, and to record this information in a monitoring device MD in the mobile switching center MSC1.

Figure 2:
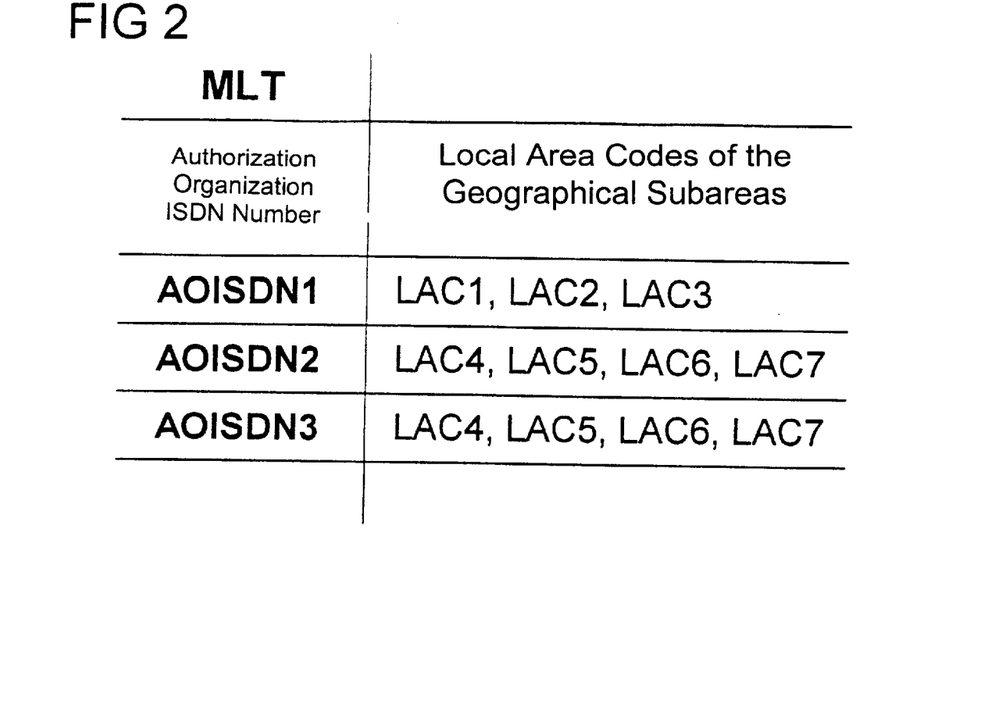
FIG. 2 is a table illustrating a structure of a correspondence table (MC-LAC table)

The mobile switching center MSC1 also contains an interception unit IU, in which an MC-LAC table MLT and a supervision file SF are stored. In the MC-LAC table MLT, whose structure is shown by way of example in FIG. 2, the authorization organizations AO1, AO2 and AO3 are identified in the left-hand column by authorization organization ISDN numbers AOISDN1, AOISDN2 and AOISDN3 assigned to them. The authorization organization ISDN numbers AOISDN1, AOISDN2 and AOISDN3 are, for example, international call numbers for switching and transmitting the recorded information to the respective authorization organizations AO1, AO2 and AO3. In the right-hand column of the MC-LAC table MLT, each of the authorization organization ISDN numbers AOISDN1, AOISDN2 and AOISDN3 is compared with a plurality of local area codes LAC1 . . . for the geographical subareas in which the respective authorization organizations AO1, AO2 and AO3 are authorized to carry out monitoring.

Figure 3:
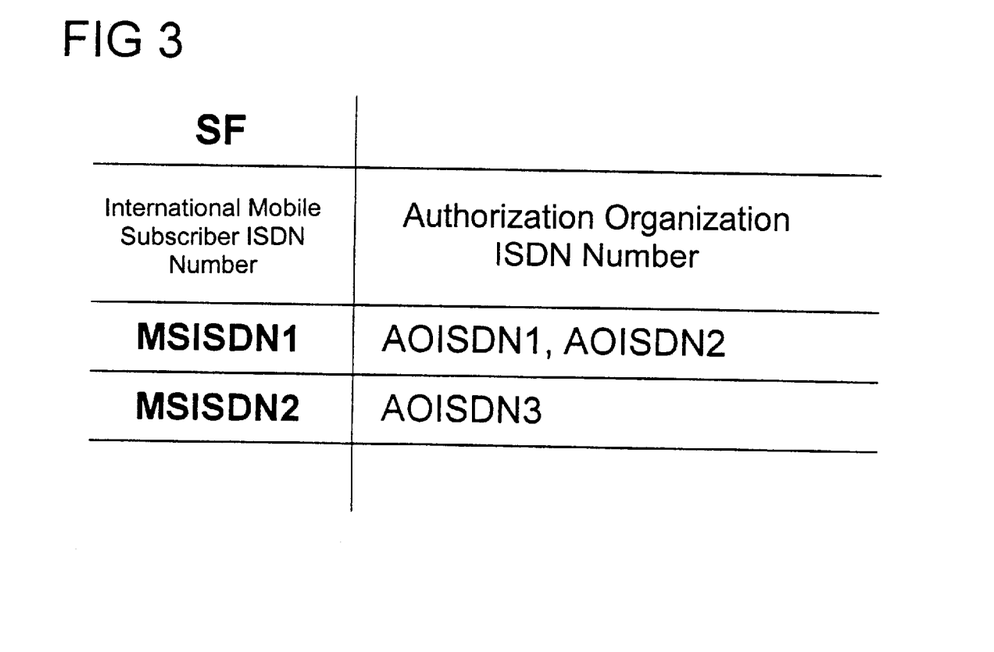
FIG. 3 is a table illustrating a structure of a supervision file.

The left-hand column of the stored supervision file SF, whose structure is illustrated by way of example in FIG. 3, shows the international mobile subscriber ISDN numbers MSISDN1 of the mobile subscriber MSUB1 who is intended to be monitored by one or more authorization organizations AO1, AO2 and AO3. In the right-hand column of the supervision file SF, the international mobile subscriber ISDN number MSISDN1 is compared with the authorization organization ISDN numbers AOISDN1, AOISDN2 of the authorization organizations AO1 and AO2 with authorization for the present location of the mobile subscriber MSUB1. The authorization is determined using the flowchart of the procedure illustrated in FIG. 4.

Figure 4:
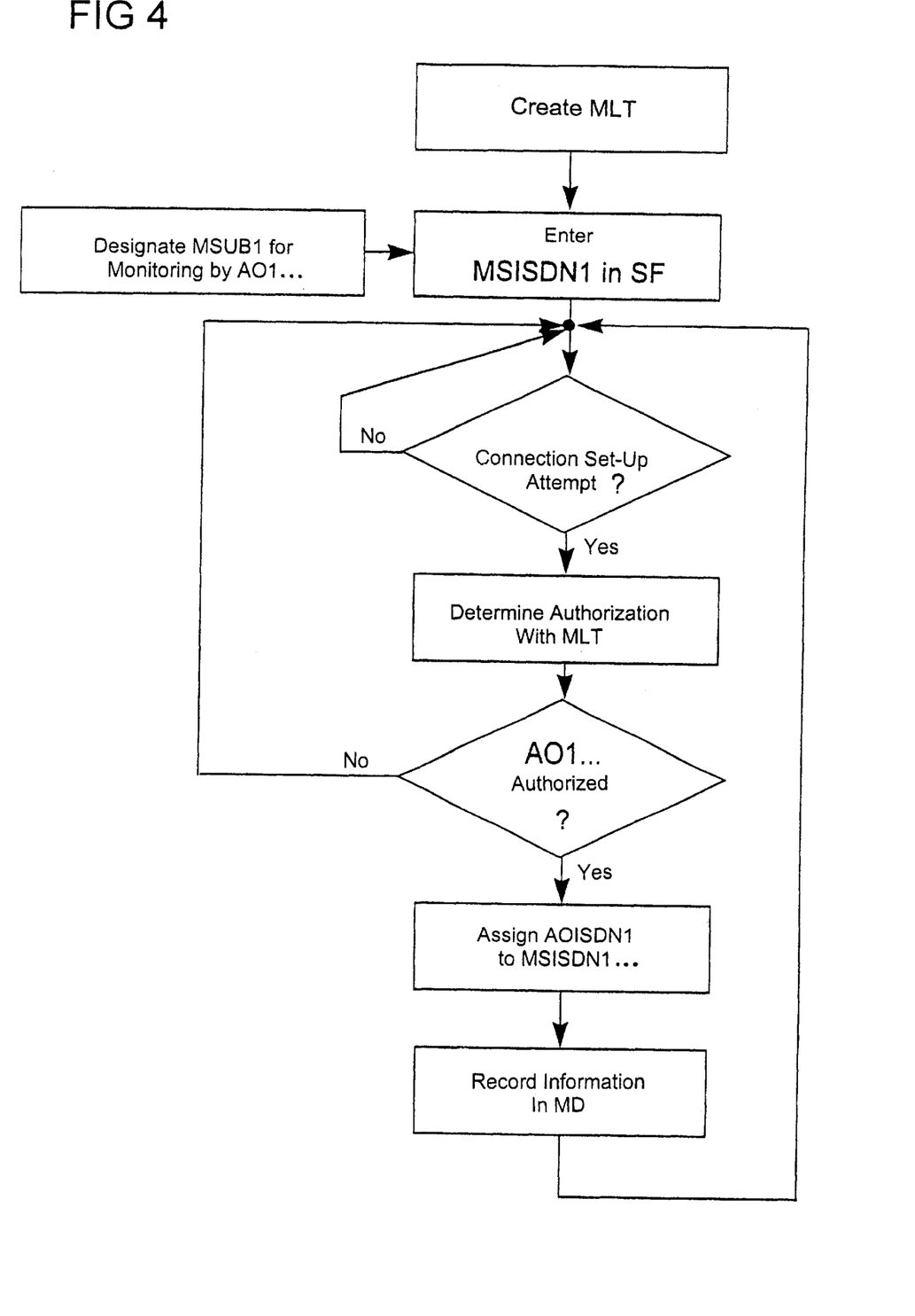
FIG. 4 is a flowchart of a method according to the invention for monitoring a communications link.

The basis of the procedure, shown in FIG. 4, for determining the authorization is the creation or establishment of the MC-LAC table MLT, that is to say the association of the geographical subareas LAC1 . . . with the authorization organization ISDN numbers AOISDN1, AOISDN2 and AOISDN3 of the authorization organizations AO1, AO2 and AO3. If, for example, the authorization organizations AO1 and AO2 intend to monitor the mobile subscriber MSUB1, then the international mobile subscriber ISDN number MSISDN1 of the mobile subscriber MSUB1 is entered in the supervision file SF of the interception unit IU in the mobile switching center MSC1. Whenever an attempt is made to set up a connection from/to a mobile station associated with the mobile radio system, the entries in the supervision file SF are checked to determine whether or not that mobile subscriber has been designated for monitoring.

By way of example, if, as described above, the mobile subscriber MSUB1 is designated for monitoring, then the MC-LAC table MLT is used to determine whether the authorization organizations AO1 and AO2 are authorized to monitor the communications link in the geographical subarea, which is identified by the local area code LAC1 . . . and in which the mobile subscriber MSUB1 is located.

If the authorization exists, the authorization organization ISDN numbers AOISDN1 and AOISDN2 of the authorization organizations AO1 and AO2 are assigned to the international mobile subscriber ISDN number MSISDN1 in the supervision file SF. The information transmitted via the communications link, as well as the signaling information for setting up a connection, are then recorded in the monitoring device MD in the mobile switching center MSC1 and, once the communications link has been cleared, are switched and transmitted to the authorization organizations AO1 and AO2 using the authorization organization ISDN numbers AOISDN1 and AOISDN2.

In conjunction with FIGS. 2, 3 and 6, FIG. 5 shows a further exemplary embodiment of the invention. In this case, the mobile switching center MSC1 is in the form of a satellite mobile switching center SMSC1, and is connected to an earth terminal controller ETC, which is in radio contact with a satellite SAT, for example via a parabolic antenna. However, the rest of the description can also be applied to a terrestrial mobile radio system which has been described.

Figure 6:
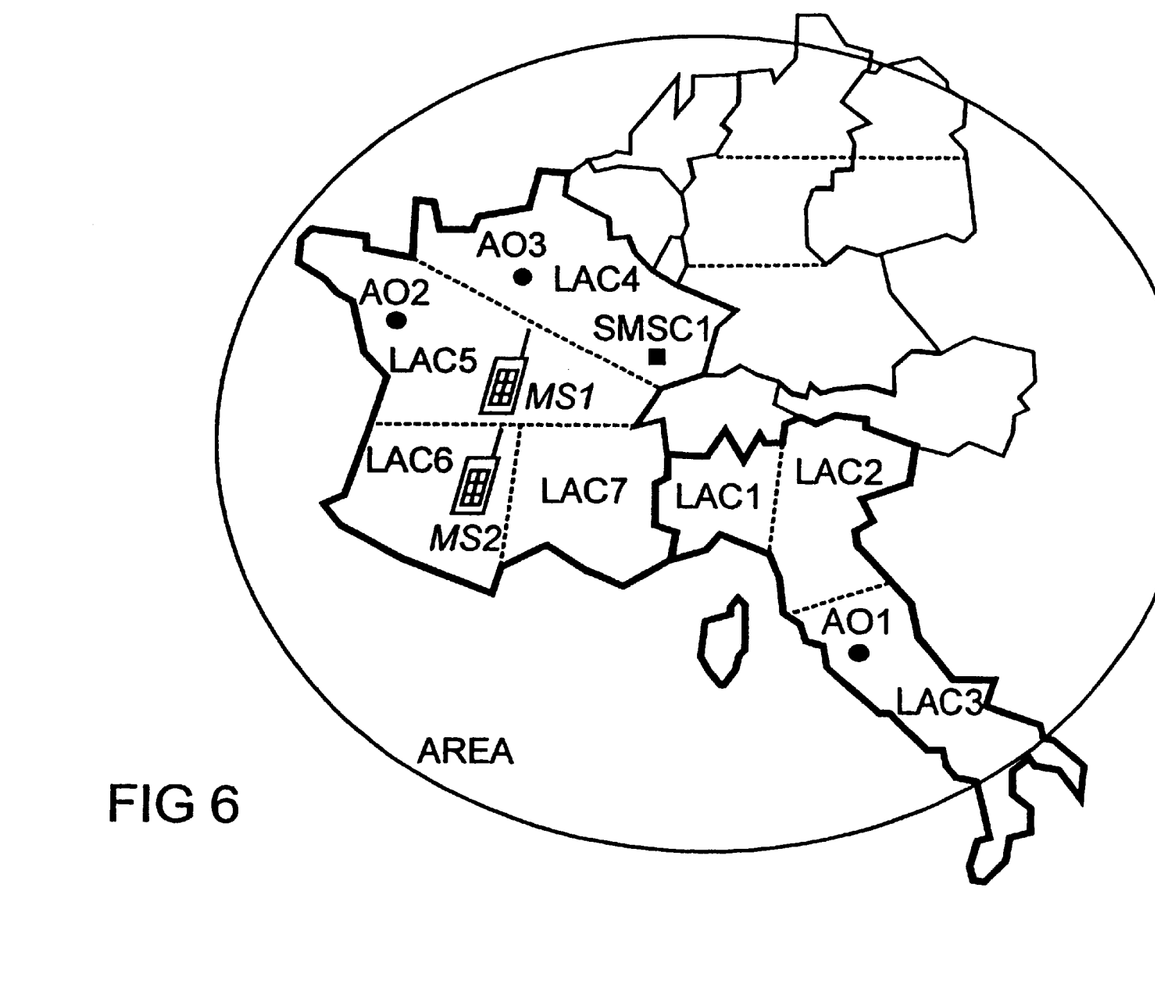
FIG. 6 is map of a geographical area, which is subdivided into geographical subareas identified by local area codes.

The satellite SAT supplies a terrestrial geographical area AREA with radio resources, for example as illustrated in FIG. 6. The geographical area AREA is split, in a comparable manner to the radio cells in terrestrial mobile radio systems, into geographical subareas, which are distinguished by different local area codes LAC1, LAC2 and so forth.

According to FIG. 6, the first mobile station MS1 and a second mobile station MS2 of the two mobile subscribers MSUB1 and MSUB2 are located in the radio supply area AREA of the satellite SAT, with the first mobile station MS1 being located in the geographical subarea which is identified by the local area code LAC5, and the second mobile station MS2 being located in the geographical subarea which is identified by the local area code LAC6. The geographical subareas with the local area codes LAC4 to LAC7 correspond to the French area of jurisdiction in this example. The two authorization organizations AO2 and AO3 are associated with these geographical subareas, as can be seen from lines 2 and 3 of the MC-LAC table MLT in FIG. 2. The adjacent, Italian area of jurisdiction is defined by the local area codes LAC1 to LAC3 in the MC-LAC table, and the authorization organization AO1 is associated with them.

By way of example, the satellite mobile switching center SMSC1 is located in the geographical subarea with the local area code LAC4, although any other location would likewise be feasible.

Figure 5:
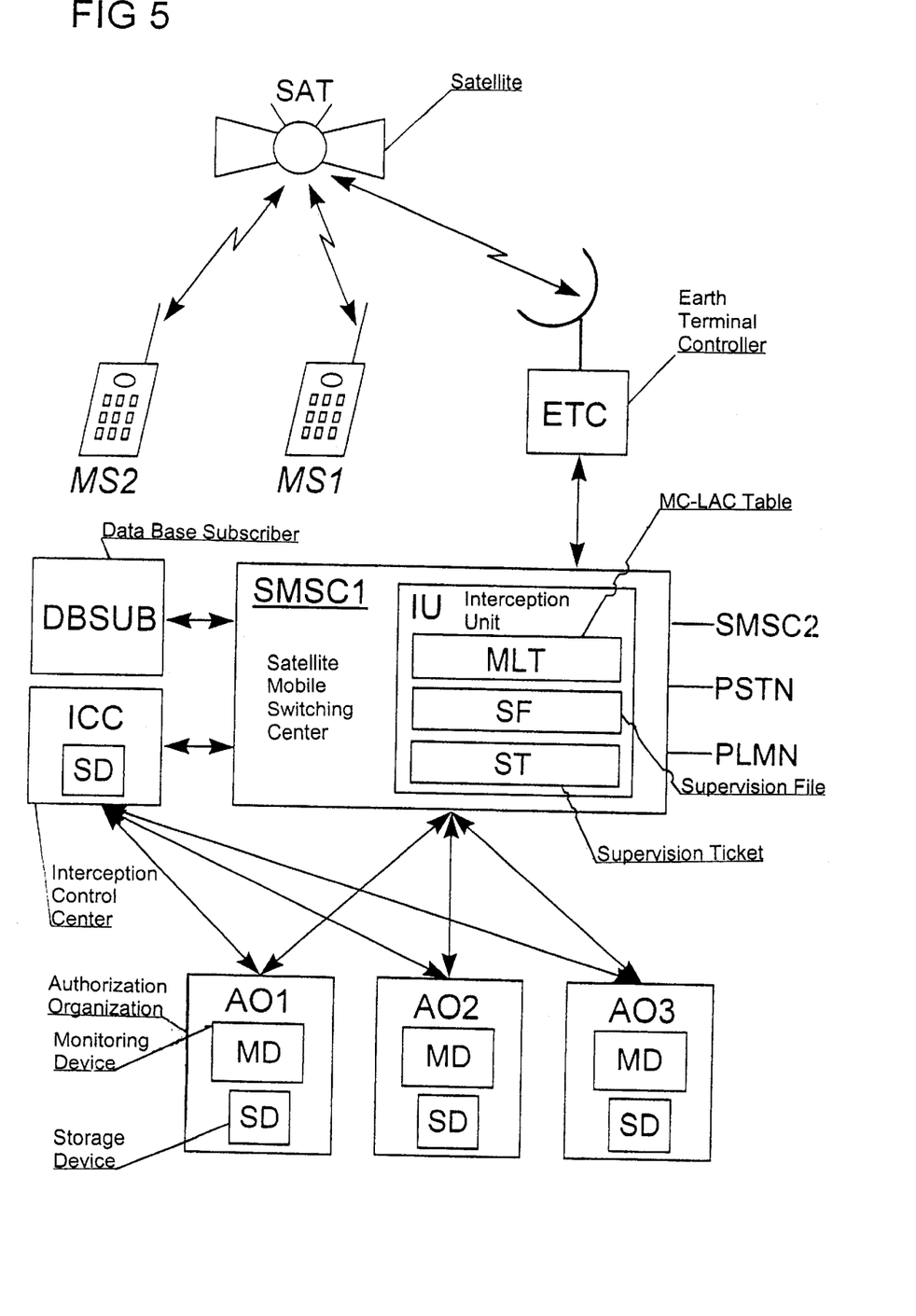
FIG. 5 is a block diagram of a part of a satellite-based mobile radio system.

The locations of the first and second mobile stations MS1 and MS2 which are respectively specified by the local area codes LAC5 and LAC6 are stored, according to FIG. 5, in a Data Base Subscriber DBSUB which is connected to the satellite mobile switching center SMSC1. Furthermore, the satellite mobile switching center SMSC1 is connected to an interception control center ICC, which is in turn connected to the authorization organizations AO1, AO2 and AO3.

The object of the interception control center ICC is to initialize and administer the parameters in the MC-LAC table MLT, in the supervision file SF and in a supervision report or supervision ticket ST, and to determine the authorization for monitoring the communications links.

The authorization organizations AO1 and AO2 jointly designate the first mobile subscriber MSUB1 for monitoring the jurisdiction areas of France and Italy. The designation for monitoring may, however, also be made by a third, for example international, authorization organization, in which case the authorization organizations AO1 and AO2 would in this situation be selected by international authorization organization to record the information. The authorization organization AO3 designates the second mobile subscriber MSUB2 for monitoring.

As a consequence of the designation for monitoring, the international mobile subscriber ISDN numbers MSISDN1 and MSISDN2 of the first and second mobile stations MS1 and MS2 are entered in the left-hand column of the supervision file. The entry in the supervision file SF may be made directly by the authorization organizations AO1, AO2 and AO3, or via the interception control center ICC.

If, following this, the two mobile subscribers MSUB1 and MSUB2 now use their mobile stations MS1 and MS2 to try to set up connections to other subscribers, for example in a terrestrial mobile radio network or telephone network, then the authorizations for monitoring are determined for each of the authorization organizations AO1, AO2 and AO3, using the procedure described in FIG. 4. The determination in the MC-LAC table MLT may be made by the interception control center ICC or automatically in the satellite mobile switching center SMSC1 using the local area codes LAC5 and LAC6 for the locations of the two mobile subscribers MSUB1 and MSUB2 in the Data Base Subscriber DBSUB. Once authorization has been confirmed, the respective authorization organization ISDN numbers AOISDN1 and AOISDN2 and/or AOISDN3 are associated with the respective international mobile subscriber ISDN numbers MSISDN1 and MSISDN2, respectively, of the two mobile subscribers MSUB1 and MSUB2 in the supervision file SF.

Spur lines or tap lines are then set, or parallel loops incorporated in the process of setting up a connection, in the satellite mobile switching center SMSC1, via which lines or loops the information transmitted on the communications links can be monitored. In the exemplary embodiment in FIG. 5, the recorded information is transmitted directly to the respective authorization organizations AO1 and AO2 and/or AO3, using the authorization organization ISDN numbers AOISDN1 and/or AOISDN2 and AOISDN3, where it is recorded in a monitoring device MD.

A supervision report or so-called supervision ticket ST is stored for each of the two mobile stations MS1 and MS2, in the interception unit IU of the satellite mobile switching center SMSC1. This supervision ticket ST may, for example, directly contain subscriber-relevant or connection-relevant information, such as a subscriber identity, date and time, connection type (outgoing (MOC) or incoming (MTC) connection), or else the call number for call forwarding (CFU). The respectively stored supervision ticket ST is transmitted directly to the authorization organizations AO1 and AO2 and/or AO3 where it is stored in a storage device SD, or is transmitted to the interception control center ICC, where it is stored in a storage device SD, from which it can in turn be transmitted to the authorization organizations AO1 and AO2 and/or AO3.

The process of monitoring the information via the communications link to the first mobile station MS1 may be carried out in such a way that, for example, the outgoing information is recorded in the first authorization organization AO1, and the incoming information is recorded in the second authorization organization AO2.

We claim:

1. A method for monitoring communications links, the method which comprises:

providing, in a mobile radio system, a mobile switching center connected to at least one of a further mobile switching center and a communications network;

assigning, with a radio network management device, radio resources to a communications link within a geographical subarea, the radio network management device being connected to a base station for transmitting and receiving information via the communications link to/from a mobile station of a mobile subscriber located in the geographical subarea;

storing a correspondence table in an interception unit of the mobile switching center, and assigning, in the correspondence table, a local area code of the geographical subarea to an authorization organization number of an authorization organization, the authorization organization being one of a regional, a national and an international authorization organization;

storing a supervision file in the interception unit, and entering, into the supervision file, an international mobile subscriber number for the mobile subscriber to be monitored by the authorization organization;

using the correspondence table for determining whether the authorization organization is authorized to monitor the communications link in the geographical subarea identified by the local area code, if an attempt to set up a connection from/to the mobile station of the mobile subscriber is made;

assigning the authorization organization number to the international mobile subscriber number in the supervision file when an authorization for monitoring exists; and recording one of information transmitted from the mobile station and information received by the mobile station via the communications link.

2. The method according to claim 1, which comprises using an MC-LAC table as the correspondence table.

3. The method according to claim 1, which comprises switching and transmitting information recorded in the mobile switching center to the authorization organization identified by the authorization organization number when the communications link has been cleared.

4. The method according to claim 1, which comprises:

diverting information from the mobile switching center to the authorization organization identified by the authorization organization number; and recording the information in a monitoring device in the authorization organization.

5. The method according to claim 1, which comprises initializing and administering parameters in the correspondence table and in the supervision file by an interception control center connected to the mobile switching center.

6. The method according to claim 1, which comprises determining the authorization for monitoring information on the communications link when the mobile subscriber enters a further geographical subarea.

7. The method according to claim 1, which comprises determining the authorization for monitoring information on the communications link periodically at given time intervals.

8. The method according to claim 1, which comprises storing, in the interception unit, at least one supervision report with subscriber-relevant and connection-relevant information for the international mobile subscriber number entered in the supervision file.

9. The method according to claim 1, which comprises:
transmitting a supervision report to the authorization organization; and
storing the supervision report in a storage device of the authorization organization.

10. The method according to claim 1, which comprises:
transmitting a supervision report to an interception control center; and
storing the supervision report in a storage device of the interception control center.

11. The method according to claim 1, which comprises determining the authorization for monitoring the communications link for a most recently known local area code when no local area code can be assigned to the mobile subscriber.

12. The method according to claim 1, which comprises:
using a satellite-based mobile radio system as the mobile radio system;
using a satellite mobile switching center as the mobile switching center;
transmitting and receiving radio signals to/from a satellite via an earth terminal controller; and
supplying, with the satellite, a geographical area with the radio resources.

13. The method according to claim 1, which comprises:
assigning, in the correspondence table, a plurality of local area codes of the geographical subarea to respective authorization organization numbers of the authorization organization; and
assigning given ones of the authorization organization numbers to the international mobile subscriber number in the supervision file when the authorization for monitoring exists.

14. A configuration for monitoring communications links in a mobile radio system, comprising:
a mobile switching center to be connected to at least one of a further mobile switching center and a communications network;
a radio network management device connected to said mobile switching center, said radio network management device assigning radio resources to a communications link within a geographical subarea;
a base station to be connected to a base station controller for transmitting and receiving information via the communications link to/from a mobile station of a mobile subscriber;
an interception unit associated with said mobile switching center;
said interception unit having a correspondence table storage for storing a correspondence table, said correspondence table assigning a local area code of the geographical subarea to an authorization organization number of an authorization organization;
said interception unit having a supervision file storage for storing a supervision file containing an international mobile subscriber number entered for the mobile subscriber to be monitored by the authorization organization; and
a monitoring device, connected to said mobile switching center, for recording one of information transmitted from the mobile station and information received by the mobile station via the communications link.

15. The configuration according to claim 14, including an interception control center connected to said mobile switching center and to be connected to the authorization organization, said interception control center initializing and administering parameters in said correspondence table and in said supervision file.

16. The configuration according to claim 14, wherein said monitoring device is provided in said mobile switching center.

17. The configuration according to claim 14, wherein said monitoring device is to be provided in the authorization organization, the authorization organization being one of a regional, national and international authorization organization.

18. The configuration according to claim 14, wherein said interception unit stores a supervision report having subscriber-relevant and connection-relevant information for the international mobile subscriber number entered in said supervision file.

19. The configuration according to claim 18, including a storage device to be provided in the authorization organization, said interception unit transmitting the supervision report to said storage device for storing the supervision report in said storage device.

20. The configuration according to claim 15, including a storage device provided said interception control center for storing a supervision report having subscriber-relevant and connection-relevant information for the international mobile subscriber number.

21. The configuration according to claim 14, including a data base subscriber connected to said mobile switching center, said data base subscriber storing the local area code of the geographical subarea of the mobile station.

22. In a satellite-based mobile radio system having a satellite for supplying a geographical area with radio resources and an earth terminal controller, a configuration for monitoring communications links, comprising:
a satellite mobile switching center for transmitting and receiving radio signals to/from the satellite via the earth terminal controller, said satellite mobile switching center to be connected to at least one of a further satellite mobile switching center and a communications networks;
an interception unit associated with said satellite mobile switching center;
said interception unit having a correspondence table storage for storing a correspondence table, said correspondence table assigning a local area code of a geographical subarea to an authorization organization number of an authorization organization;
said interception unit having a supervision file storage for storing a supervision file containing an international mobile subscriber number entered for a mobile subscriber to be monitored by the authorization organization; and
a monitoring device, connected to said satellite mobile switching center, for recording one of information transmitted from the mobile station and information received by the mobile station via the communications link.

* * * * *